United States Patent [19]
Stemme et al.

[11] 4,368,489
[45] Jan. 11, 1983

[54] GALVANOMETER-TYPE TILTING-MIRROR SCANNING SYSTEM AND CIRCUIT THEREFOR

[75] Inventors: Otto Stemme, Munich; Eduard Wagensonner, Aschheim; Wolfgang Ruf, Munich, all of Fed. Rep. of Germany

[73] Assignee: Agfa-Gevaert AG, Leverkusen, Fed. Rep. of Germany

[21] Appl. No.: 279,038

[22] Filed: Jun. 30, 1981

Related U.S. Application Data

[63] Continuation-in-part of Ser. No. 56,789, Jul. 11, 1979, Pat. No. 4,330,793.

[30] Foreign Application Priority Data

Jul. 17, 1978 [DE] Fed. Rep. of Germany ....... 2831296
Jul. 1, 1980 [DE] Fed. Rep. of Germany ....... 3024903

[51] Int. Cl.³ .................... H04N 3/08; G02B 27/17
[52] U.S. Cl. .................................... 358/208; 350/6.6; 350/486; 250/235
[58] Field of Search ................ 358/41, 43, 44, 48, 358/54, 75, 212–216, 293, 294, 208; 355/8; 350/6.6, 486; 346/109; 250/235

[56] References Cited

U.S. PATENT DOCUMENTS 2,993,403 7/1961 Harries ............................. 358/208

Primary Examiner—John C. Martin
Attorney, Agent, or Firm—Michael J. Striker

[57] ABSTRACT

A galvanometric tilting-mirror scanning system shifts an image of an original projected onto a photodiode row in a direction transverse to such row. The tilting-mirror mechanism is provided with an oil-filled damping chamber, heated and maintained at stabilized temperature. The control voltage driving the tilting-mirror system includes a sawtooth component whose lower-slope flanks determine the mirror's scanning sweep; a negative pulse which effects mirror tiltback or flyback; a positive pulse which brakes the tiltback and accelerates the mirror back up to its forwards-direction scanning-sweep speed; and finally a corrective component. The corrective component has the form of a pulse which increases the slope of the sawtooth component's lower-slope flanks during a time interval extending beyond the system's vertical blanking allotment, to compensate the non-linearity in the motion of the mirror which would exist during its forwards-direction scanning-sweep interval in the absence of the corrective component.

6 Claims, 7 Drawing Figures

4,368,489

GALVANOMETER-TYPE TILTING-MIRROR SCANNING SYSTEM AND CIRCUIT THEREFOR

CROSS-REFERENCE TO RELATED APPLICATION

This is a continuation-in-part of our copending application Ser. No. 56,789, filed July 11, 1979, entitled "ELECTRONIC SCANNING OF SUPER-8 FILMS FOR REPRODUCTION ON A T.V. VIEWING UNIT," now U.S. Pat. No. 4,330,793, the entire disclosure of which is hereby incorporated herein by reference.

BACKGROUND OF THE INVENTION

The present invention concerns electronically controlled systems for the scanning of originals, especially the frames of motion-picture film, for reproduction on a T.V. picture tube in accordance with some standard T.V. scanning schedule.

The invention is especially concerned with the scanning system disclosed in the parent application, provided with means for projecting an image of the original to be scanned into a focal plane, a charge-coupled device having a row of photodiodes located in the focal plane, and means for converting the signals produced by the charge-coupled device into T.V. signals, the projecting means including a tilting-mirror scanning mechanism which shifts or deflects the projected image of the original across the photodiode-row, in a direction which is perpendicular to such row and which corresponds to vertical-deflection direction, periodically at a frequency corresponding to the vertical scanning frequency, e.g., 50 Hz, of the standard television scanning schedule being employed. The tilting-mirror scanning mechanism is of the type employed in tilting-mirror galvanometers and is driven, via an amplifier, by a summing circuit which receives various control-voltage components.

To prevent development of image flicker on the picture tube of the T.V. apparatus used for reproduction, the deflection of the scanning system's tilting mirror must exhibit an extremely high degree of linearity during its forwards-direction scanning sweep. The tiltback motion of the scanning mirror, in preparation for its next forwards-direction scanning sweep, must be performed very quickly and should exhibit as little transient irregularity as possible. The tiltback motion is performed during the vertical blanking interval of a standard T.V. scanning schedule, e.g., of 1.2 ms duration. Thus, from the start of the scanning mirror's tiltback motion to the recommencement of its highly linear forwards-direction scanning sweep, only 1.2 ms is available for reestablishment of the steady forwards-direction scanning-sweep speed. Accordingly, the electromechanical characteristics of the galvanometer-type tilting-mirror scanning system must be so designed that the system's upper limit frequency assures that the system's transient response lasts no longer than, e.g., 1.2 ms. This condition is very difficult to achieve when scanning mirrors of relatively large surface area are involved, because of the inertia of the moving parts of the scanning system.

SUMMARY OF THE INVENTION

Accordingly, it is an object of the present invention to provide a tilting-mirror scanning system capable of performing both the tiltback operation and the return to highly linear forwards-direction sweep speed within the short time available during the vertical-blanking interval, e.g. 1.2 ms, of whatever standard T.V. scanning schedule is being employed.

In the presently preferred embodiment of the invention, the galvanometer-type tilting-mirror mechanism employed is provided with oil-damped action, and to maintain the damping action stabilized the oil is maintained by a heating device at a stabilized temperature. The control voltage used to drive the tilting-mirror mechanism is comprised of several control-voltage components. One component is a sawtooth voltage whose lower-slope flanks determine the forwards-direction sweep of the tilting mirror, and whose higher-slope flanks occur during scanning mirror tiltback. Another control-voltage component is a brief tiltback pulse which is generated at the end of each lower-slope flank of the sawtooth voltage, and is used to effect rapid mirror tiltback. A further control-voltage component is a brief forwards-acceleration pulse, which follows upon the tiltback pulse, and is used to rapidly brake the tiltback motion, reverse the direction of mirror motion, and accelerate the tilting mirror back up to its forwards-directon scanning-sweep speed. The sum of the pulse-durations of the tiltback and forwards-acceleration pulses does not exceed the duration of the vertical blanking interval of the standard T.V. scanning schedule employed.

These control-voltage components are preferably generated separately and combined in a summing circuit, so that the amplitudes of the sawtooth voltage, the tiltback voltage pulse and the forwards-acceleration voltage pulse can all be adjusted independently of one another. The summing circuit furthermore receives, as a further control-voltage component, a corrective voltage in the form of a corrective pulse furnished during the vertical blanking or tiltback interval, and continuing somewhat thereafter, and being of a shape and duration serving to compensate the transient irregularity which the motion of the tilting mirror would otherwise exhibit during and also beyond the end of the vertical blanking interval in the absence of such corrective pulse.

Thus, the loss or distortion of linearity attributable to the transient response of the electromechanical scanning system is compensated. The damping oil employed exerts a great damping action on the tilting-mirror system at the start of the mirror's tiltback, due to the high acceleration to which the mirror is subjected at that time. If the corrective control-voltage component of the present invention were not employed, then there would result a time interval, longer than the vertical blanking interval, during which there would exist no linear relationship between the control voltage and the deflection of the tilting mirror, or equivalently, between the deflection of the tilting mirror and elapsed time. Such non-linearity results in image distortion in the image produced on the picture tube of the reproduction apparatus, typically in the form of image flicker. The use of a summing circuit makes it particularly easy to superimpose or combine the individual control-voltage components, which then can be adjusted individually as needed.

In accordance with an advantageous feature of the invention, the circuitry which generates the corrective control-voltage component comprises a rectangular-pulse generator to whose output is connected a differentiator stage whose time-constant corresponds to the duration of the interval during which the linearity loss exists. This yields a corrective pulse whose magnitude progressively changes in a manner useful for effective the requisite correction.

According to an alternative feature of the invention, the circuitry which generates the corrective control-voltage component, as a corrective pulse, is connected by a control line to the circuit stage which produces the tiltback pulse, the tiltback flank of the tiltback being responded to by an integrator stage whose time-constant is matched to the duration of the non-linearity. Such integrator, like the differentiator must mentioned, can then produce a pulse whose magnitude progressively changes in a manner useful for effecting the requisite correction.

According to another feature of the invention, the metallic chamber containing the damping oil is in thermally conductive contact with a cold-conductive resistor body, i.e., a resistor whose resistance value undergoes a marked increase when its temperature increases above a predetermined temperature; this serves to inherently maintain the temperature of the damping oil substantially stabilized at such predetermined temperature. This renders the damping action afforded by the damping oil substantially independent of ambient-temperature variations. The aforementioned non-linearity in the motion of the tilting mirror results in great part from the braking action of the damping oil, which is dependent on the speed of motion of the tilting mirror. Thus, the corrective control-voltage component in effect compensates for the speed-dependent braking action of the damping oil. Accordingly, the combination of the features set forth above can be made to yield an electromechanical scanning system whose transient response is of very short duration, and whose transient response furthermore involves extremely small deviations from linear motion.

When scanning successive film frames of film transported uninterruptedly at constant transport speed, the control voltage includes a further control-voltage component which permits the scanning system to scan one film frame more than once during a time interval equal to the film transport period; if the film transport speed is 16⅔ frames per second, the film transport speed is equal to the reciprocal of 16⅔ frames per second. In the case of a 16⅔ frames-per-second transport speed, the scanning system is made to perform three complete scans of each film frame before such film frame moves out of the operative range of the scanning system. The further control-voltage component takes the form of a staircase voltage waveform, the voltage level of which changes by one step for each successive scanning of one and the same film frame. If the film transport speed is 16⅔ frames per second, the staircase voltage changes its voltage level by one step at intervals of 20 ms each, completing three such steps during the repeated (threefold) scanning of each successive film frame, and then the staircase returns to its original level. In this way, the motion of the scanning mirror can be made to match the film transport speed (16⅔ frames per second) to the image-repetition frequency (50 Hz) of the particular standard T.V. scanning schedule employed. In the particular case of 16⅔ frames per second and 50 Hz, the scanning mirror shifts the projected image of a film frame by an amount corresponding to only ⅔ the film frame height (measured in film transport direction) during each one of the three successive scanning operations performed upon that film frame.

The novel features which are considered characteristic for the invention are set forth in particular in the appended claims. The invention itself, however, both as to its construction and its method of operation, together with additional objects and advantages thereof, will be best understood from the following description of preferred embodiments, when read in connection with the accompanying drawing.

BRIEF DESCRIPTION OF THE DRAWING

FIG. 4 depicts the circuitry which generates the control voltage of FIG. 4a;

FIG. 4a depicts the corrected version of the control voltage of FIG. 2;

DESCRIPTION OF THE PREFERRED EMBODIMENTS

Figure 1:
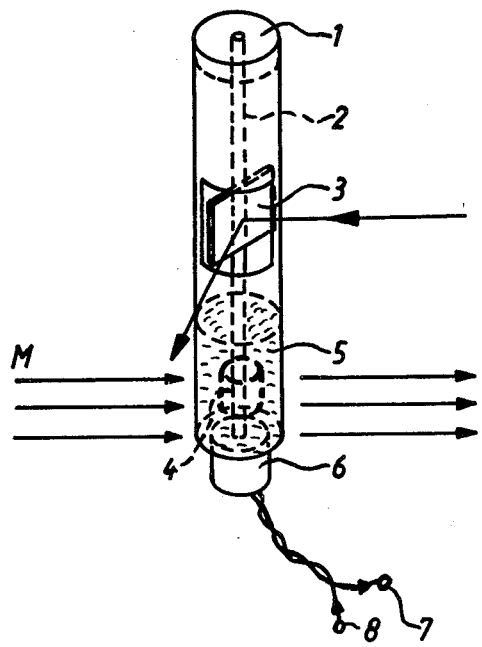
FIG. 1 schematically depicts a galvanometer-type tilting-mirror scanning system, provided with oil-damped action.

In FIG. 1, numeral 1 denotes the metallic housing of a galvanometer-type tilting-mirror mechanism, the housing 1 accommodating a mirror 3 mounted for tilting motion on a taut suspension strip 2. Suspension strip 2 is furthermore connected to a rotary magnet 4 located in a magnetic field M. Rotary magnet 4 is located within an oil-filled chamber 5. A cold-conductive resistor body 6 is secured to the lower face of the metallic housing 1, in thermally conductive contact therewith, and is connected via leads 7 and 8 to a non-illustrated voltage source. The cold-conductive resistor body 6 has a resistance value which undergoes a marked increase when its temperature increases up to a predetermined value, e.g. 70° C. When the temperature of resistor body 6, and of the oil in chamber 5, is relatively low, the electrical resistance of body 6 is relatively low, and heating current of relativey high magnitude flows through body 6; when the temperature of resistor body 6 and the oil in chamber 5 increases, the heating current drops off sharply; in this way, the temperature of the body 6 and the oil in chamber 5 is inherently stabilized at about the aforementioned value, e.g. 70° C.

Figure 2:
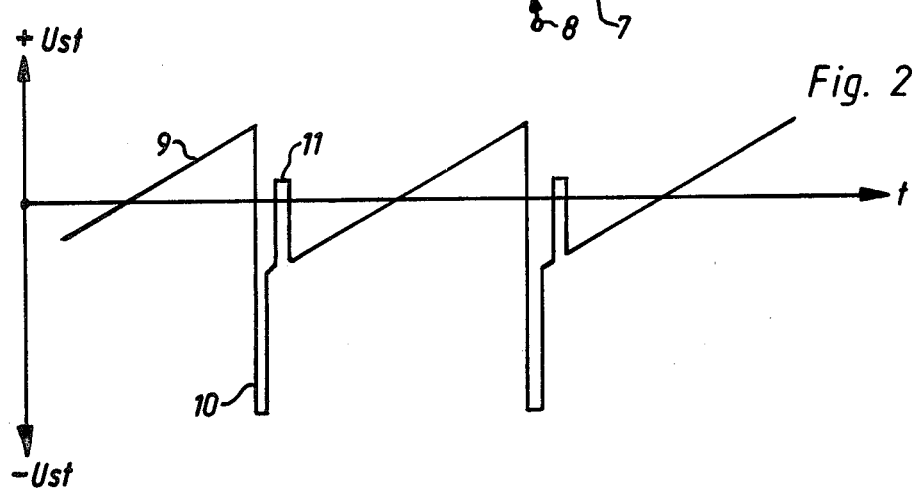
FIG. 2 depicts the variation with respect to time of the control voltage used to drive the scanning system of FIG. 1.

As will be understood by persons familiar with the operation of galvanometer-type tilting-mirror systems, the angular position of tilting mirror 3 is controlled by the magnetic field M, which in turn is controlled by a control voltage applied to a (non-illustrated) coil structure producing the field M. In the present invention, such tilting-mirror system is used to scan originals, mainly the frames of motion-picture film, for T.V. recording and/or reproduction purposes. Preferably, the tilting mirror system serves to progressively shift an image of the original projected onto a row of photo-sensitive elements across such row, in a direction perpendicular to the length of the row and corresponding to vertical T.V. image deflection. If the scanning operation performed by the tilting mirror is synchronized with a T.V. scanning schedule according to one of the recognized T.V. standards, then each sweep of the mirror to its maximum deflection serves for the scanning of one T.V. field (two fields per T.V. frame). FIG. 2 depicts the control voltage Ust used to effect such scanning motion. After the tilting mirror has completed a forwards-direction scanning sweep, a large negative pulse is required in the control voltage, to abruptly and strongly effect acceleration of the tilting mirror in the backwards direction, for its tiltback or flyback motion. In general, the amount of energy which such direction-reversing negative pulse can usefully supply to the tilting-mirror system is limited by the electromechanical characteristics of the system. Due to the direction-reversing negative pulse, the tilting mirror 3 will have a high velocity by the time it reaches the end of its tiltback motion. Upon completion of the tiltback, this backwards-directed motion must be abruptly braked and then the mirror strongly accelerated in the forwards direction again, in order to bring its forwards velocity back up to the level needed for its forwards-direction scanning sweep. This braking and acceleration up to scanning-sweep speed requires a positive control-voltage pulse following immediately or nearly immediately upon the negative pulse. By properly adjusting the time of occurrence, the duration and the amplitude of the positive control-voltage pulse, the tilting mirror can be brought very quickly up to the required scanning-sweep speed.

In FIG. 2, numeral 9 denotes the linear-rise phase of the control voltage, corresponding to the tilting mirror's scanning sweep; numeral 10 denotes the negative control-voltage pulse, effecting the tiltback of the mirror; and numeral 11 denotes the positive control-voltage pulse, which accelerates the mirror back up to its forwards-direction scanning-sweep speed.

Figure 3:
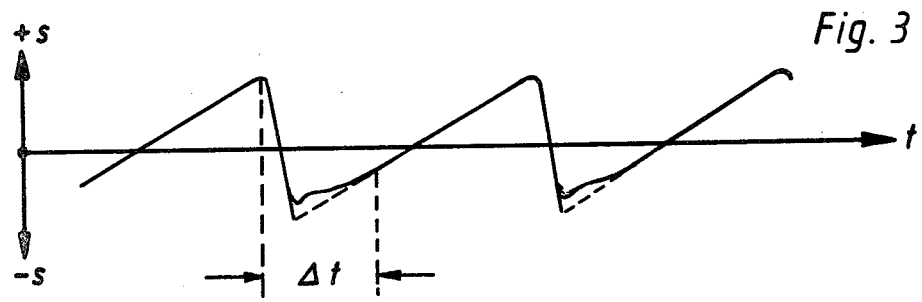
FIG. 3 depicts the variation with respect to time of the position of the tilting mirror, when the scanning system of FIG. 1 is driven by the control voltage of FIG. 2.

FIG. 3 graphically depicts the periodic forwards and backwards motion of the tilting mirror 3, the instantaneous position of the mirror being denoted by s. If the operation of the scanning system is to be synchronized with some standard T.V. scanning schedule, then the tiltback phase of the mirror's periodic motion should, of course, be confined to a time interval corresponding to the vertical blanking interval of such schedule. However, due to the viscosity of the oil in chamber 5, the deflection of the mirror exhibits non-linearity not only within the vertical blanking interval per se, but continuing through the rest of a time interval $\Delta t$ which, as shown in FIG. 3, undesirably extends into the actual scanning interval of the periodic motion.

Figure 4:
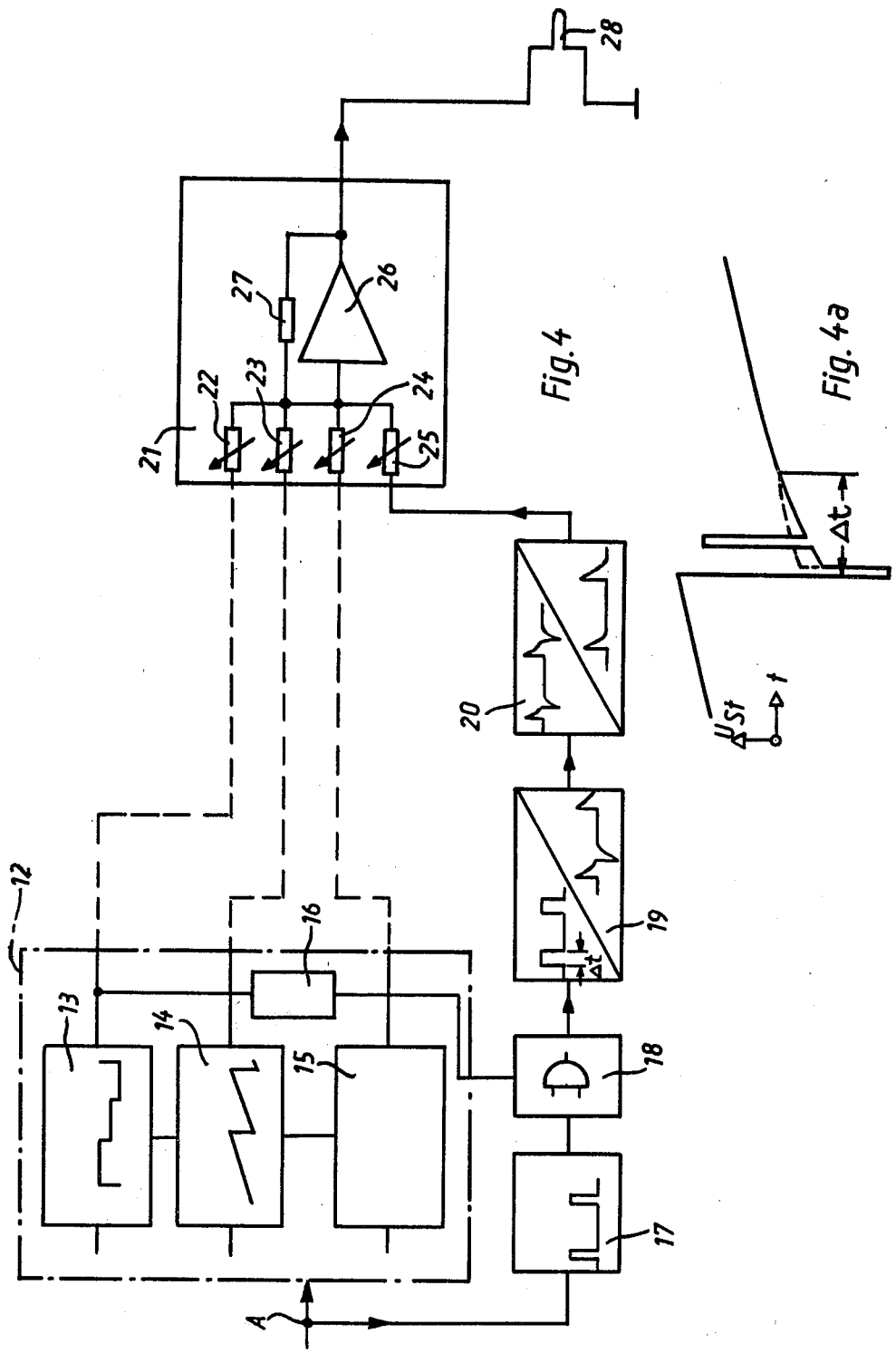
Figure 5:
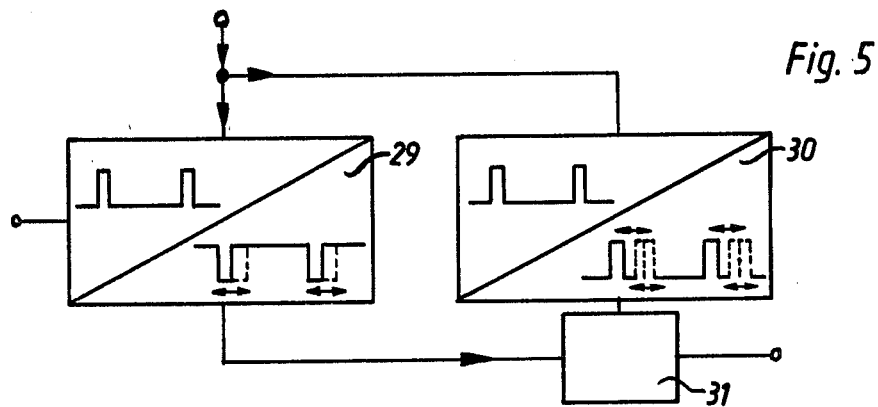
FIG. 5 depicts the internal configuration of the pulse generator stage 15 of FIG. 4.

In FIG. 4, numeral 12 denotes in toto a pulse-generating circuit which is triggered via a control line A. Circuit 12 includes a rectangular-staircase voltage generator 13, which is only used for the scanning of the frames of motion-picture film during continuous film transport; if the original being scanned by the system is stationary during the scanning operation, then the voltage component furnished by generator 13 is not needed. Circuit 12 furthermore includes a sawtooth voltage generator 14. Numeral 15 denotes a pulse-generating stage which produces both the aforementioned negative pulse effecting tiltback and the aforementioned positive pulse effecting high forwards acceleration; the internal configuration of stage 15 is shown in FIG. 5. Numeral 16 denotes a pulse-evaluating stage which produces a blocking pulse when the staircase voltage produced by stage 13 reaches a predetermined lower limit.

Numeral 17 denotes a rectangular-pulse generator, also triggered via control line A. Connected to the output of rectangular-pulse generator 17 is a gating circuit 18 which becomes non-transmissive in response to the blocking pulse produced by pulse-evaluating stage 16. This gating action serves to assure that the corrective voltage of the present invention, still to be described, is produced only upon the completion of the tiltback motion of the tilting mirror. (As shown in FIG. 2 of the parent case, the end of the third scanning sweep continues into the fourth scanning sweep without the need for an intermediate tiltback motion. Another such gating circuit, likewise controlled by stage 16, can be connected to the output of stage 15, for the same purpose.)

Numeral 19 denotes a differentiator stage which receives the pulses produced by stage 17 and produces positive-going voltage pulses in response to the leading flanks of the received pulses, and negative-going pulses in response to the trailing flanks of the received pulses. The time-constant of differentiator stage 19 is so selected that the duration of each differentiated pulse is equal to the duration $\Delta t$ of the non-linearity described above.

A rectifier stage 20 receives the positive-going and negative-going pulses produced by differentiator stage 19, but transmits only the negative-going pulses.

Numeral 21 denotes in toto a summing circuit comprised of adjustable summing resistors 22, 23, 24, 25 and an amplifier 26 provided with a feedback resistor 27. The output of the summing circuit 21 is connected to and drives the coil system 28 of the galvanometer-type tilting-mirror mechanism. The summing resistors 22, 23, 24 are respectively connected to the outputs of the aforedescribed circuit stages 13, 14, 15, and summing resistors 25 is connected to the output of rectifier 20.

FIG. 4a depicts the effect on the control voltage Ust (FIG. 2) of the corrective voltage component furnished by the circuit stages 17, 18, 19, 20. In FIG. 4a, the corrected control voltage $U_{St}$, within the aforementioned time interval $\Delta t$ thereof, has a steeper positive slope than the uncorrected control voltage Ust (FIG. 2) within that time interval. In FIG. 4a, the slope of the uncorrected control voltage prevailing during time interval $\Delta t$ is shown in broken lines.

This dropping-down or slope increase of the control voltage $U_{St}$ during time interval $\Delta t$ serves to compensate the aforedescribed non-linearity in the forwards-direction sweep motion of the tilting mirror 3.

FIG. 5 depicts the internal configuration of the pulse-generating stage 15 of FIG. 4. Stage 15 includes a pulse-generating stage 29 which responds to the tiltback flanks of the waveform from sawtooth voltage generator 14 by producing negative voltage pulses, used to effect the fast tiltback of the scanning mirror. A further such pulse-generating stage 20 produces positive pulses of the same period, used in the aforedescribed manner to brake the mirror's tiltback motion and accelerate it in forwards direction back up to the scanning-sweep speed. Numeral 31 denotes a summing circuit, which like summing circuit 21 has plural adjustable summing resistors, one receiving the pulses from stage 29, the other receiving the pulses from stage 30. The pulse-generating stages 29 and 30 are preferably comprised of adjustable monostable multivibrators such as to permit easy adjustment of the pulse-duration of the output pulses produced by stages 29 and 30. For example, pulse-generating stage 30 can be comprised of two monostable multivibrators provided with two adjustment potentiometers to permit the time of occurence of the output pulse of stage 30 and the pulse-duration of such pulse to be adjusted independently of each other; such circuit configurations are, in themselves, well known.

Figure 6:
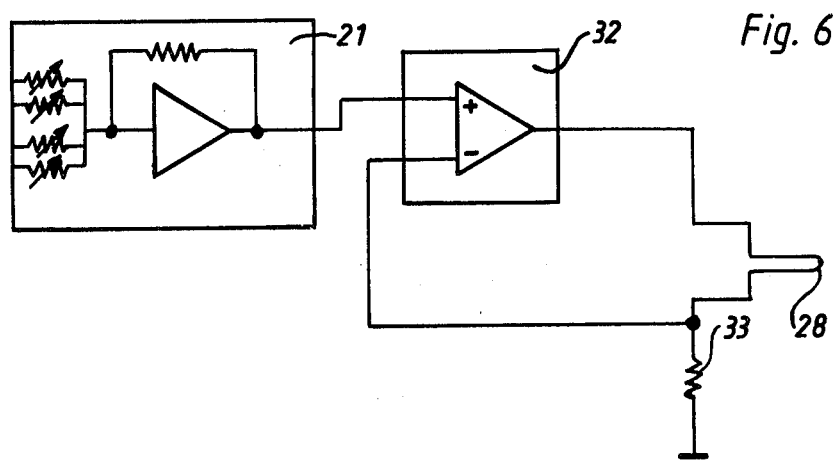
FIG. 6 depicts a modification of the circuitry shown in FIG. 4.

In FIG. 6, the circuit of FIG. 4 is modified by inclusion of an operational amplifier 32 between summing circuit 21 and the coil system 28 of the galvanometer structure. A resistor 33 is connected in series with the coil system 28. The voltage drop across resistor 33 varies in correspondence to the current flowing through coil system 28, and this voltage is fed back to the inverting input of operational amplifier 32. In this way, the control voltage produced at the output of summing circuit 21 can be used to determine the galvanometer-coil current, instead of determining its voltage.

It will be understood that each of the elements described above, or two more together, may also find useful application in other types of deflection systems differing from the types described above.

While the invention has been illustrated and described as embodied in a galvanometer-type tilting-mirror scanning circuit and control circuit therefor used for converting scanned images into T.V. signals, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a scanning system of the type which scans originals by shifting an image of an original projected onto the photodiode row of a charge-coupled device in a direction transverse to the photodiode row, in combination, a galvanometric tilting-mirror mechanism including a mirror mounted for tilting motion and used to shift the projected image of an original to be scanned, and including an oil-filled structure operative for damping the motion of the tilting-mirror mechanism; heating means operative for stabilizing the temperature of the oil in the oil-filled structure; control circuit means generating a control signal which determines the tilting motion of the mirror and is comprised of plural control-signal components, including a sawtooth-waveform component which determines the forwards-direction scanning sweep speed of the tilting mirror, a tiltback component in the form of a pulse of a polarity causing the tilting mirror to perform a rapid tiltback motion, a forwards-accelerating component in the form of a pulse of a polarity which brakes the rapid tiltback motion and accelerates the mirror back up to its forwards-direction scanning speed, the sum of the durations of the tiltback component and the forwards-accelerating component not exceeding the vertical blanking interval of the standard T.V. scanning schedule employed, and a corrective component in the form of a pulse which compensates for the loss of linearity as between the sawtooth-waveform component and the motion of the mirror which would occur in the absence of the corrective component.

2. A scanning system as defined in claim 1, the control circuit means including adjusting means operable for adjusting the amplitudes of the sawtooth-waveform component, the tiltback component and the forwards-accelerating component independently of one another.

3. A scanning system as defined in claim 1, the control circuit means including means generating rectangular pulses synchronized with the sweep flanks of the sawtooth waveform component and differentiating circuit means deriving the corrective component from the rectangular pulses by differentiating the latter, the differentiating circuit means having a time-constant corresponding to the time interval during which said loss of linearity would occur in the absence of the corrective component.

4. A scanning system as defined in claim 1, the control circuit means comprising integrating means responding to the tiltback-component pulse and deriving from the latter the corrective component, the integrating means having a time-constant corresponding to the time interval during which said loss of linearity would occur in the absence of the corrective component.

5. A scanning system as defined in claim 1, said heating means including a resistor located to heat the oil in the oil-filled chamber and having a resistance value which undergoes a marked increase when its temperature increases above a predetermined value, whereby to inherently maintain the oil temperature at about such predetermined value.

6. A scanning system as defined in claim 1, the corrective component being of such polarity and shape as to cause the sweep-implementing flank of the sawtooth-waveform component to be of increased slope within a time interval extending beyond the end of the vertical blanking interval into the forwards-direction scanning-sweep interval of the mechanism.

* * * * *